(12) United States Patent
Panchaksharaiah et al.

(10) Patent No.: US 11,785,314 B2
(45) Date of Patent: Oct. 10, 2023

(54) SYSTEMS AND METHODS TO ENHANCE SEGMENT DURING TRICK PLAY

(71) Applicant: Rovi Guides, Inc., San Jose, CA (US)

(72) Inventors: Vishwas Sharadanagar Panchaksharaiah, Karnataka (IN); Harshith Kumar Gejjegondanahally Sreekanth, Karnataka (IN); Pawan Nagdeve, Bangalore (IN); Anjum Makkar, Punjab (IN); Reda Harb, Bellevue, WA (US)

(73) Assignee: Rovi Guides, Inc., San Jose, CA (US)

(*) Notice: Subject to any disclaimer, the term of this patent is extended or adjusted under 35 U.S.C. 154(b) by 30 days.

(21) Appl. No.: 17/519,137

(22) Filed: Nov. 4, 2021

(65) Prior Publication Data
US 2023/0133199 A1    May 4, 2023

(51) Int. Cl.
*H04N 21/81* (2011.01)
*G06V 20/40* (2022.01)
*H04N 21/472* (2011.01)
*H04N 21/4725* (2011.01)
*H04N 21/45* (2011.01)
*H04N 21/442* (2011.01)
*H04N 21/435* (2011.01)

(52) U.S. Cl.
CPC ......... *H04N 21/8133* (2013.01); *G06V 20/41* (2022.01); *G06V 20/49* (2022.01); *H04N 21/435* (2013.01); *H04N 21/44204* (2013.01); *H04N 21/4532* (2013.01); *H04N 21/4725* (2013.01); *H04N 21/47217* (2013.01); *G06V 2201/10* (2022.01)

(58) Field of Classification Search
CPC ............ H04N 21/8133; H04N 21/435; H04N 21/44204; H04N 21/4532; H04N 21/47217; H04N 21/4725; G06V 20/41; G06V 20/49; G06V 2201/10
See application file for complete search history.

(56) References Cited

U.S. PATENT DOCUMENTS

| | | | | |
|---|---|---|---|---|
| 5,557,515 A | * | 9/1996 | Abbruzzese ... | G06Q 10/063114 705/7.15 |
| 5,654,942 A | * | 8/1997 | Akahane ......... | H04B 1/20 369/2 |
| 6,868,225 B1 | * | 3/2005 | Brown ............ | G11B 27/36 386/E5.001 |
| 8,670,457 B2 | * | 3/2014 | Anderson ....... | H04L 65/1069 370/454 |

(Continued)

FOREIGN PATENT DOCUMENTS

WO        2021126867 A1    6/2021

*Primary Examiner* — Timothy R Newlin
(74) *Attorney, Agent, or Firm* — Haley Guiliano LLP

(57) ABSTRACT

Systems and methods are provided herein for including supplemental content with segments based on the complexity of the segment. This may be accomplished by a system receiving complexity information related to a media asset and user information related to a viewer to determine if one or more segments of the media asset is complex for the user. If the system receives a trick play command, from the user, during a segment categorized as complex, the system can use the complexity information and user information to generate supplemental content, facilitating better user understanding of the complex segment.

18 Claims, 13 Drawing Sheets

(56) References Cited

U.S. PATENT DOCUMENTS

| | | | | |
|---|---|---|---|---|
| 8,745,206 | B1* | 6/2014 | Chang | H04N 21/6581 709/224 |
| 8,959,540 | B1* | 2/2015 | Gargi | H04N 21/44008 725/19 |
| 9,436,876 | B1* | 9/2016 | Carlson | G06V 20/698 |
| 9,532,111 | B1* | 12/2016 | Christie | G06F 3/03547 |
| 9,854,324 | B1 | 12/2017 | Panchaksharaiah et al. | |
| 9,998,794 | B1* | 6/2018 | Newell | H04N 21/8133 |
| 2003/0152363 | A1* | 8/2003 | Jeannin | H04N 21/8549 |
| 2007/0280638 | A1* | 12/2007 | Aoki | H04N 5/765 386/231 |
| 2009/0045281 | A1* | 2/2009 | Acciari | B65H 19/28 242/520 |
| 2010/0162286 | A1* | 6/2010 | Berry | H04H 60/33 725/14 |
| 2012/0134646 | A1* | 5/2012 | Alexander | G11B 27/322 386/E9.011 |
| 2013/0117248 | A1* | 5/2013 | Bhogal | H04N 21/42203 707/705 |
| 2013/0151728 | A1* | 6/2013 | Currier | H04N 21/4126 709/248 |
| 2015/0016804 | A1* | 1/2015 | Biderman | G06V 20/41 386/343 |
| 2015/0163558 | A1* | 6/2015 | Wheatley | H04N 21/25891 725/12 |
| 2015/0245101 | A1* | 8/2015 | Stathacopoulos | H04N 21/42201 725/61 |
| 2015/0365730 | A1* | 12/2015 | Mohan | G11B 27/322 725/21 |
| 2016/0092088 | A1* | 3/2016 | Doyle | A63F 13/63 715/738 |
| 2016/0323639 | A1* | 11/2016 | Iwakura | H04N 21/44224 |
| 2017/0006252 | A1* | 1/2017 | Patel | G11B 27/005 |
| 2018/0288481 | A1* | 10/2018 | Goyal | G09B 5/065 |
| 2018/0349368 | A1* | 12/2018 | Bellingham | G06F 16/164 |
| 2019/0208282 | A1* | 7/2019 | Singh | G08B 13/19665 |
| 2020/0099979 | A1* | 3/2020 | Panchaksharaiah | H04N 21/44004 |

* cited by examiner

SYSTEMS AND METHODS TO ENHANCE SEGMENT DURING TRICK PLAY

BACKGROUND

The present disclosure relates to trick play features such as rewind, pause, and fast-forward, and in particular to techniques for providing supplemental content during trick play.

SUMMARY

Whether it is to allow a user to pause a movie to go make popcorn or rewind a television show to re-watch an action scene, trick play features (e.g., pause, rewind, fast-forward, etc.) have become commonplace for viewers consuming media. Many users utilize trick play features to help them better understand the content they are viewing. Trick play features are especially helpful when a user is viewing a media asset with complex topics, ambiguous and/or unclear cinematography (e.g., the scene progressing too quickly, the focal point of the scene being unstable, etc.), and/or other complex elements. For example, if a user is watching a movie (e.g., "The Matrix"), which is related to complex topics the user is unfamiliar with (e.g., future technology, artificial intelligence, etc.), the user can rewind complex scenes in the hopes of better understanding the complex scenes. However, there is no guarantee that rewinding complex scenes, or pausing a complex scene to search the Internet for explanations, will help the user better understand the complex scene. This sub-optimal user experience can lead to frustrated users giving up on complex media. In view of these deficiencies, there exists a need for improved systems and methods for including supplemental content with complex media segments during trick play to facilitate better user understanding of the complex segments.

Accordingly, techniques are disclosed herein for including supplemental content with segments during trick play based on the complexity of the segment. To facilitate the inclusion of supplemental content with complex segments during trick play of a media asset, the system can use one or more complexity factors to determine if a given segment in the media asset is complex. These complexity factors may include the viewing habits of users who have watched the media asset, reviews related to the media asset, metadata associated with the media asset, or similar such complexity-related information. When the media asset is made available to the public, the system can monitor (e.g., via Live Logging data) viewing habits of users for trick play trends. For example, if a number of users rewind a first segment of the media asset, the system can determine that the first segment is a complex segment. When determining the complexity of a segment, the system may also consider whether there are reviews available for the media asset. For example, online platforms (e.g., Twitter, Facebook, IMDb, Netflix, Prime, TiVo, etc.) often have reviews where they explain and/or discuss complex segments of media assets. These reviews can be used to determine if certain segments of the media asset are complex. When determining the complexity of a segment, the system can also use the metadata associated with the media asset. For example, metadata related to a first segment may indicate that the first segment has complex dialogue.

The system can distinguish between complex segments and interesting segments. Sometimes users rewind a segment because the segment has a lot of action (e.g., interesting), not because the user is confused about the complexity of the segment. For example, if the system uses viewing habits to determine that a first segment is rewound often by users, the system can check the metadata of the first segment to determine if the first segment comprises action or dialogue. If the first segment comprises action, the first segment is likely an interesting segment, and if the first segment comprises dialogue the first segment is likely a complex scene. In another example, again the system may determine, using the viewing habits, that a first segment is rewound often by users. The system may also determine the focal point and/or speed of the first segment using metadata of the first segment. If the first segment's focal point lacks stability and/or the speed of the scene is fast, the first segment is likely a complex segment, and if the first segment's focal point has stability and/or the speed of the scene is slow, the first segment is likely an interesting segment. The system can use one or more of the complexity factors to determine if a first segment is complex. If the system determines that a first segment is complex, the system can tag the first segment with a complexity identifier. The complexity factors may relate to a complexity score, and the system may tag a segment with a complexity score over a given threshold with a complexity identifier.

The system can use the complexity factors along with user information to generate supplemental content for a complex segment. For example, when a user initiates a trick play function during a first segment, the system can retrieve the complexity information (e.g., complexity factors) related to the first segment along with user information. The user information can relate to the user's demographic traits, the user's general knowledge of the information included in the first segment, information about the user's viewing environment, user's viewing habits, the user preferences for supplemental content, and similar such information. For example, a user may rewind during a first segment tagged as complex where the metadata associated with the first segment indicates that the segment relates to a first topic (e.g., World War I). The system may determine that the user information indicates that the user has never viewed any content relating to the first topic and that the first segment is tagged as complex so supplemental content is required. Accordingly, the system can generate supplemental content for the user as the user rewinds the first segment. In another example, a user may rewind during a second segment tagged as complex where the metadata associated with the second segment indicates that the segment relates to a second topic (e.g., artificial intelligence). The system may determine that the user information indicates that the user often watches content involving the second topic and determines that the supplemental content is not required for the user. Accordingly, the system may rewind the first segment and not include any supplemental content. Sometimes the system may include the supplemental content if the user rewinds a scene more than once, or may present the user with a selectable option (e.g., "Would you like more information related to this scene?") to include supplemental comment.

The supplemental content may include any information that aids the user in understanding the complex segment. Supplemental content may include content featuring audio, video, and/or textual data associated with the complex segment. The supplemental content can be customized to the user based on the received user information. For example, when a user initiates a trick play function during a first segment, the user information can indicate that the user prefers supplemental content in a video format, and the system can insert a video explaining the complex segment for playback before resuming the complex segment. In another example, the system may include a link to the video or overlay the video onto the complex segment instead of presenting the video for playback before resuming the complex segment. In another example, the user information may indicate that the user prefers supplemental content from a certain source (e.g., IMDb), and the system selects the highest-rated video explaining the complex segment from the preferred source for playback before resuming the complex segment.

The supplemental content may comprise a video montage generated by the system. The montage may be audio and/or video that incorporates previous segments of the media asset. For example, if a complex segment relates to a first and second segment that occurred earlier in the media asset, parts of the first and second segment can be included in the montage to help the user understand the complex segment. In another example, a user initiates a trick play function during a complex segment of the media asset that is part of a series (e.g., television series, movie trilogy, etc.), and the generated montage includes segments from previously presented content. The supplemental content can be generated using complexity factors and/or user information. For example, segments of a media asset may be categorized based on content information (e.g., actor, character, plot arc, topic, etc.). When the system determines that a first segment associated with a first content information (e.g., plot arc dealing with revenge) is complex, the system can generate a montage including previous segments associated with the first content information (e.g., previous actions inspiring the revenge plot arc).

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
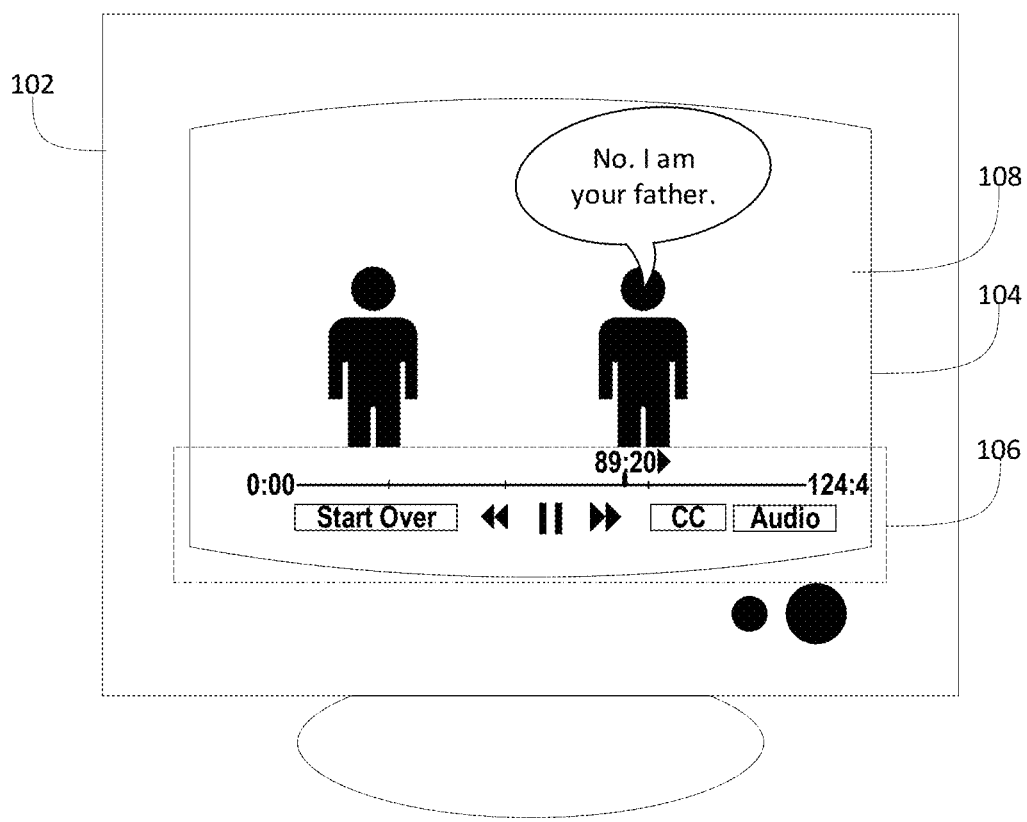
FIGS. 1A-1C show illustrative diagrams of a user device including supplemental content along with complex media segments during trick play, in accordance with embodiments of the disclosure.
Figure 1B:
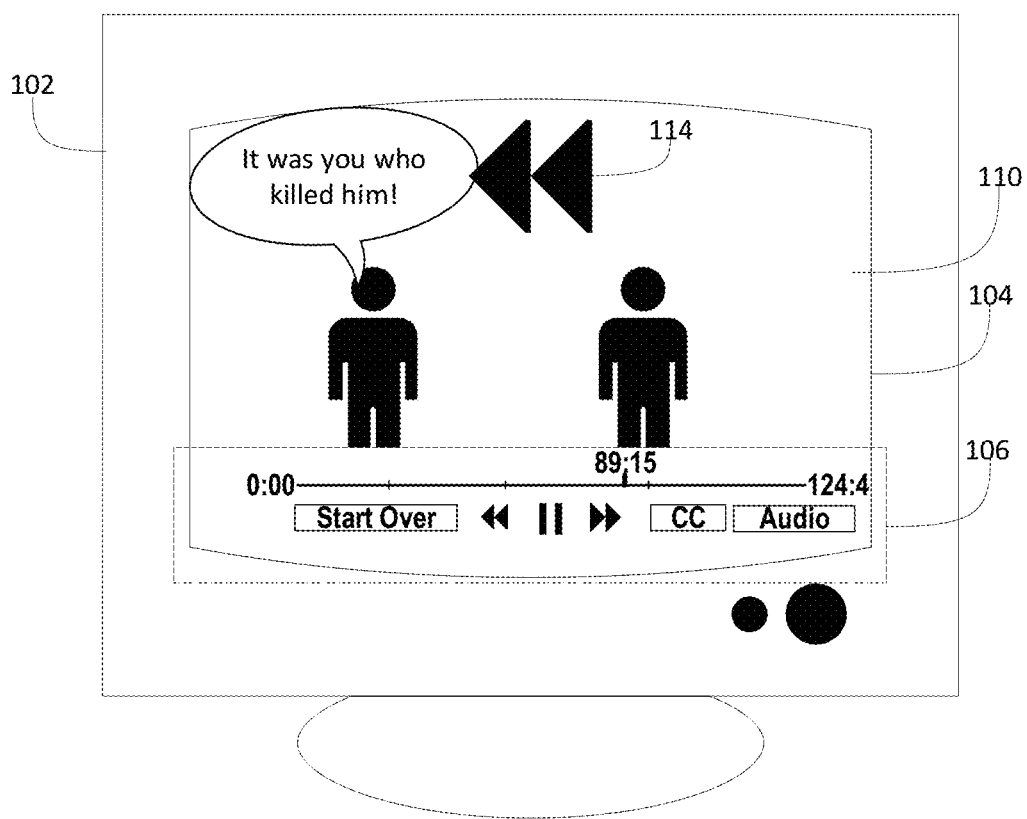
Figure 1C:
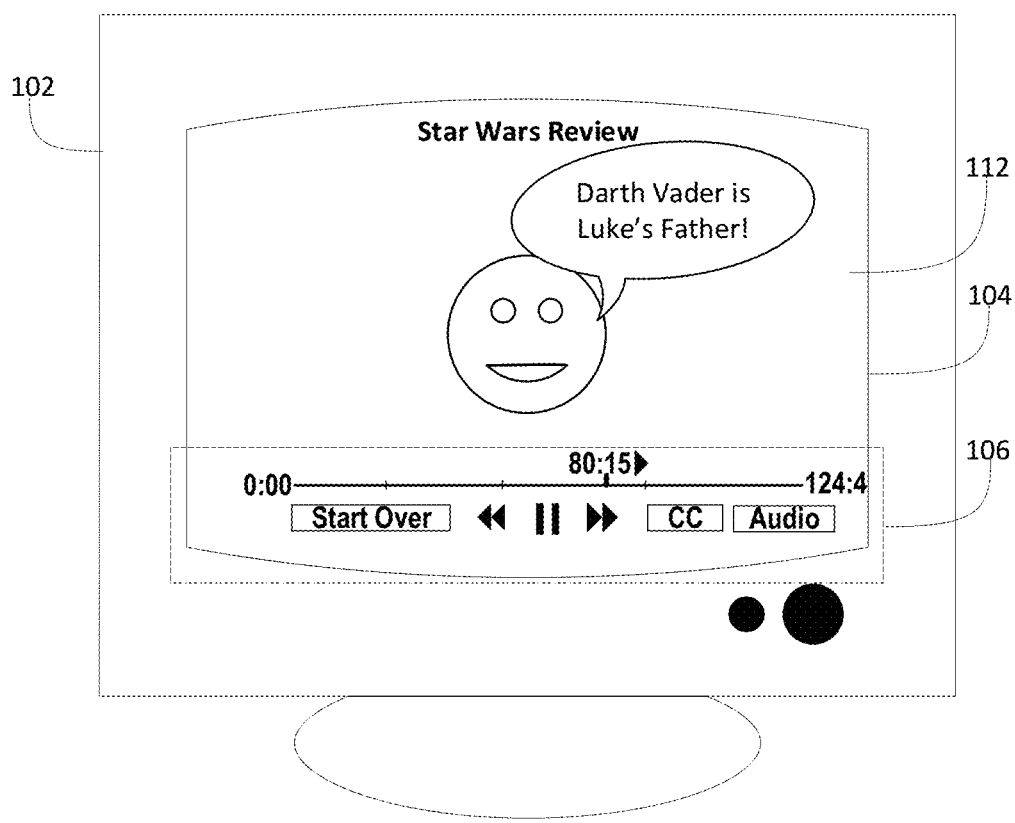

FIGS. 1A-1C show illustrative diagrams of a user device 102 including supplemental content along with complex media segments during trick play, in accordance with some embodiments of the disclosure. FIG. 1A's system 100 comprises a user device 102 displaying a first scene 108 of a media asset on a display 104. Although a television is used in this example, the user device 102 may be any device capable of playing a media asset, such as televisions, laptops, tablets, smartphones, or similar such devices. The media asset/asset may be any type of media including television programs, movies, audio books, podcasts, playlists, songs, videos, audio, images or similar content, and any combination thereof. In some embodiments, a media asset includes or is divided into one or more segments, where the segments comprise one or more scenes.

FIG. 1B shows the user device 102 receiving a rewind command 114 from a user viewing a second scene 110. In some embodiments, the user inputs the rewind command 114 by selecting a rewind button from a menu 106. In some embodiments, the user inputs the rewind command 114 by pressing a button on a remote control, issuing a voice command, and/or similar such methodologies. Although a rewind command 114 is displayed, similar such commands may be used.

In some embodiments, upon receiving the rewind command 114 the system 100 determines whether the inclusion of supplemental content is required. In some embodiments, the system 100 provides supplemental content when receiving a trick play command (e.g., rewind command 114) during a complex segment. For this example, the first scene 108 and the second scene 110 are two scenes included in a first segment. In some embodiments, the system 100 uses complexity information about the first segment to determine if the first segment is complex. The complexity information may be included in metadata received by the user device 102. In some embodiments, the complexity information comprises a complexity identifier and/or complexity factors. In some embodiments, complexity factors include viewing habits of users who have watched the media asset, reviews related to the media asset, metadata associated with the media asset, or similar such complexity-related information. For example, metadata associated with the first segment may contain an identifier indicating that the first segment is complex if a first number of users rewound the first segment of the media asset.

In some embodiments, if the system 100 determines that the first segment is complex, the system 100 generates supplemental content 112. In some embodiments, supplemental content 112 may include audio, video, and/or textual data associated with the first segment. FIG. 1C displays the user device 102 displaying supplemental content 112 before resuming playback of the first segment. In some embodiments, the system 100 receives supplemental content related to the first segment from a server. In some embodiments, the system 100 searches a database and/or online platform for supplemental content related to the first segment. For example, the system 100 may search for reviews that discuss a word or phrase (e.g., "No. I am your father.") that is contained in the dialogue of the first segment (first scene 108). In another example, the system 100 may search for reviews associated with a first identifier (e.g., Luke's father) that is similar to or the same as a second identifier (e.g., Darth Vader) found in metadata associated with the first segment.

As shown in FIG. 1C, the user device 102 can display supplemental content 112 before resuming playback of the first segment. In some embodiments, the user device 102 rewinds the media asset to the beginning of the first segment and plays supplemental content before starting playback of the first segment. In some embodiments, the user device 102 displays a selectable link to the supplemental content 112 during the rewind operation 110 or overlays the supplemental content 112 onto the first segment during playback.

In some embodiments, the supplemental content comprises a video montage. The montage may be a video that incorporates previous segments of the media asset and/or related media assets. In some embodiments, segments and/or scenes of the media asset are categorized based on content information (e.g., actor, character, plot arc, topic, etc.). In some embodiments, when the system 100 determines that the first segment, associated with a first content information item (e.g., Darth Vader being Luke's father), is complex, the system generates a montage including previous segments that are also associated with the first content information item (e.g., previous actions showing how Darth Vader is Luke's father). For example, the video montage for the first segment may contain parts from a second segment (e.g., romance between Padmé and Anakin) and a third segment (e.g., Anakin becoming Darth Vader) because the second and third segments relate to the first segment (Darth Vader being Luke's father) and help the user better understand the first segment.

The supplemental content 112 can be customized based on user information. In some embodiments, user information relates to the user's demographic traits, user's general knowledge on content information, information about the user's viewing environment, user's viewing habits, user preferences for supplemental content, and similar such information. In some embodiments, after receiving a trick play command (e.g., rewind command 114) during a complex segment, the system 100 uses the user information to generate the supplemental content 112. For example, the user information may indicate that the user viewing the media asset prefers supplemental content 112 in a video format, and the system 100 generates the supplemental content 112 in a video format. In another example, the user information may indicate that the user viewing the media asset prefers supplemental content 112 from a first source (e.g., IMDb), and the system selects the highest-rated video relating to the first segment from the preferred source.

User information can also be used to determine if supplemental content 112 should be generated and/or displayed. For example, the user information may indicate that a loud noise (e.g., doorbell, talking, etc.) was detected in the vicinity of the user device 102 before the rewind command 114 was received. The system 100 may determine that no supplemental content 112 is required, despite the first segment being tagged as complex, because the loud noise was likely the reason for the rewind command 114 and not the complexity of the scene. In another example, the user information may indicate that the user often watches media assets involving a first topic (e.g., space travel), and the user inputs a rewind command 114 during a first segment tagged as complex. The complexity information related to the first segment may indicate that the first segment includes the first topic. The system 100 may determine that no supplemental content is required 112, despite the first segment being tagged as complex, because the user often watches content involving the first topic and likely issued the rewind command 114 due to interest in the first segment rather than being confused by the first segment. In another example, the user information may indicate that the user never watches media assets involving a second topic (e.g., Christmas), and the user inputs a rewind command 114 during a first segment not tagged as complex. The complexity information related to the first segment may indicate that the first segment includes the second topic but has a low complexity score. The system 100 may determine that supplemental content is required 112 despite the first segment not being tagged as complex because the user never watches content involving the second topic and likely issued the rewind command 114 due to confusion with the first segment rather than being interested or amused by the first segment.

Figure 2A:
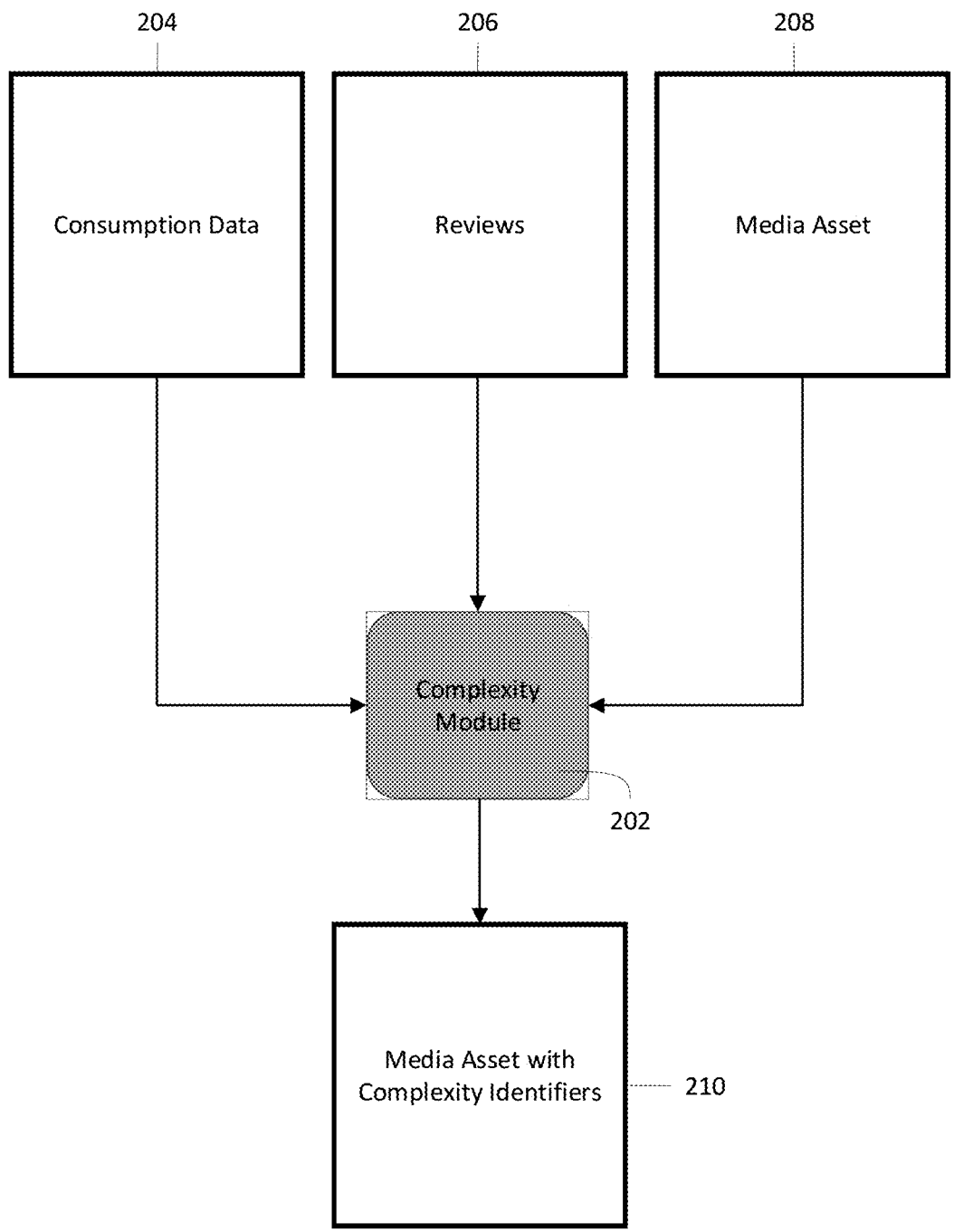
FIGS. 2A and 2B show block diagrams of an illustrative process for determining that a segment of a media asset is complex, in accordance with embodiments of the disclosure.
Figure 2B:
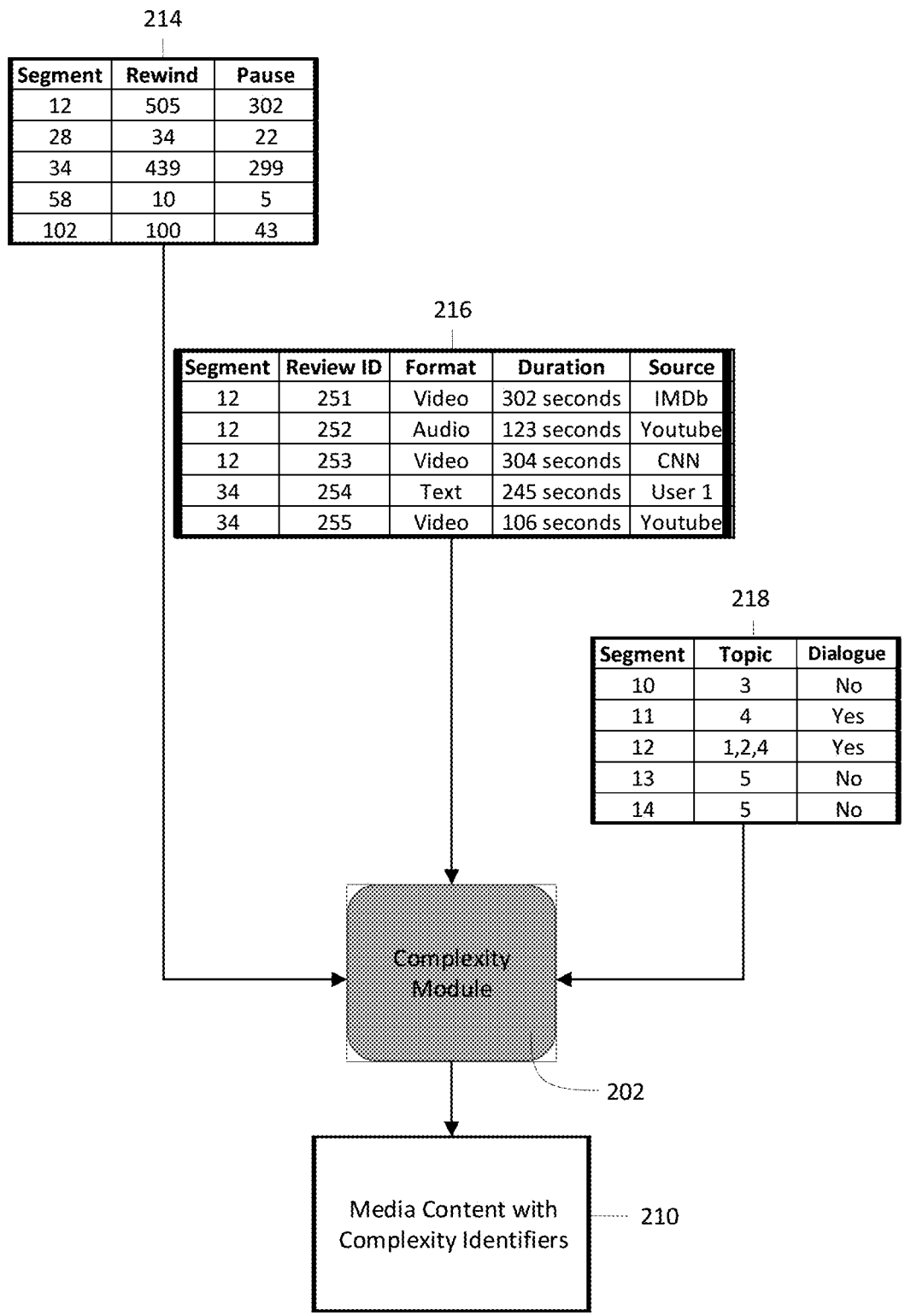

FIGS. 2A and 2B show block diagrams of an illustrative process for determining that a segment of a media asset is complex, in accordance with some embodiments of the disclosure. In some embodiments, the complexity module 202 receives consumption data 204 of a media asset, which is collected by monitoring consumption of the media asset. In some embodiments, the consumption data 204 may be collected at or by the complexity module 202. In some embodiments, the consumption data 204 includes trick play commands received during consumption of the media asset. For example, in FIG. 2B, a first consumption data 214 includes the number of users that rewound and paused a plurality of segments of the media asset. As shown, the first consumption data 214 includes the data related to all segments that were rewound or paused. In some embodiments, the first consumption data 214 includes only segments that received at least a threshold number of trick play commands.

In some embodiments, the complexity module 202 receives reviews 206 relating to the media asset. In some embodiments, the reviews 206 may be collected at or by the complexity module 202. In some embodiments, the complexity module 202 receives reviews 206 related to the media asset from a server. In some embodiments, the complexity module 202 searches a database and/or online platform for reviews 206 related to the media asset. For example, the complexity module 202 may search for reviews that discuss a word or phrase (e.g., "No. I am your father.") that is contained in the dialogue of the media asset. In another example, the complexity module 202 may search for reviews associated with a first identifier (e.g., Luke's father) that is similar or the same to a second identifier (e.g., Darth Vader) found in metadata associated with the media asset and/or a segment of the media asset. In some embodiments, the reviews 206 include review information, such as an indicator that a review relates to a first segment of the media asset. For example, as shown in FIG. 2B, the review information 216 can include the segment that a review relates to, the review ID, the format of a review, the duration of a review, and the source of a review. Although the reviews 206 are described as a plurality of reviews, in some embodiments the reviews 206 are a single review. In some embodiments, the complexity module 202 filters the reviews 206. For example, the complexity module 202 may check a first review's credentials (e.g., number of views, number of likes, number of comments, number of verifications, etc.) and determine if the credentials satisfy certain parameters. In some embodiments, the complexity module 202 only uses reviews 206 that satisfy a first parameter (e.g., more than 1,000 views).

In some embodiments, the complexity module 202 receives the media asset 208. In some embodiments, the media asset 208 also includes metadata related to the media asset 208. In some embodiments, the metadata includes content information (e.g., actor, character, plot arc, topic, etc.), audio information (e.g., dialogue, music, etc.), video information (e.g., focal point of a segment, speed of a segment, etc.), and/or similar such information. For example, as shown in FIG. 2B, the media asset 208 can comprise a first set of metadata 218 related to the media asset, including segment identifiers, topics related to the segments, and dialogue indicators.

In some embodiments, the complexity module 202 uses the consumption data 204, reviews 206, and/or the media asset 208 to determine if one or more segments of the media asset 208 are complex. In some embodiments, the complexity module 202 can use a single input to determine if one or more segments of the media asset 208 are complex. For example, if the first consumption data 214 indicates that a segment (e.g., segment 12) has been rewound by a threshold number of users (e.g., more than 300 users), then the complexity module 202 can determine that the segment (e.g., segment 12) is a complex segment. In another example, if the review information 216 indicates that one or more reviews (e.g., review ID 251 and review ID 252) relate to a segment (e.g., segment 12), then the complexity module 202 can determine that the segment (e.g., segment 12) is a complex segment. In another example, if a first set of metadata 218 indicates that a segment (e.g., segment 12) involves more than one topic and/or involves a complex topic, then the complexity module 202 can determine that the segment (e.g., segment 12) is a complex segment.

In some embodiments, the complexity module 202 can use multiple inputs to determine if one or more segments of the media asset 208 are complex. For example, the complexity module 202 may receive consumption data 204 indicating that a first segment is rewound by a number of users, where the number exceeds a first threshold. The complexity module 202 may also use metadata of the received media asset 208 to determine that the first segment involves no dialogue. In some embodiments, the complexity module 202 uses the number of users who rewound the first segment and the metadata indicating that there was no dialogue in the first segment to determine that the first segment is not complex. In some embodiments, the complexity module 202 makes this determination because a segment that is rewound more than the first threshold but has no dialogue is likely an action sequence and is unlikely to be a complex segment. In some embodiments, the complexity module 202 uses one or more conditions to determine if a segment is complex. For example, a first condition may be that if the number of users who rewound a first segment is above the first threshold and the metadata indicates that there was dialogue in the first segment, the first segment is complex. In some embodiments, the complexity module uses the received inputs (e.g., consumption data 204, reviews 206, and media asset 208), to generate a complexity score. In some embodiments, the different inputs are weighted differently. For example, consumption data 204 indicating that a first number of users (e.g., 500 users) rewound a first segment may be weighted higher than review information indicating that there are only a few reviews relating to the first segment. In another example, consumption data 204 indicating that a first number of users (e.g., 100 users) rewound a first segment may be weighted less than if the consumption data 204 indicated that a second number of users (e.g., 500 users) rewound the first segment.

In some embodiments, each segment of the media asset 208 that the complexity module 202 determined to be complex is tagged with a complexity identifier, generating the media asset with complexity identifiers 210. In some embodiments, the media asset with complexity identifiers 210 is transmitted to user devices (e.g., user device 102) for playback. In some embodiments, the complexity identifiers are included in the metadata of the media asset with complexity identifiers 210. FIG. 2B displays the first consumption data 214, the review information 216, and a first set of metadata 218 having the same segment identifiers (e.g., segment 12) corresponding to the same segments of the media asset. In some embodiments, segments are defined by the complexity module 202. The complexity module 202 may define complex segments by determining the start and end times of complex segments using one or more received inputs (e.g., consumption data 204, reviews 206, media asset 208, etc.). For example, the metadata related to the media asset may indicate that a scene starting at a first time and ending at second time corresponds to a first topic (e.g., time travel). In some embodiments, if the complexity module 202 determines that the first topic is complex, then the complexity module defines the portion of the media asset between the start and end time of the first topic as a complex segment.

In some embodiments, the complexity module 202 uses the consumption data 204, reviews 206, and/or the media asset 208 to generate a knowledge graph for the media asset 208. In some embodiments, the generation of the knowledge graph uses semantic enrichment processes to construct nodes, labels, etc., and the complexity module 202 can use the knowledge graph to determine whether to tag a segment as complex and/or generate supplemental content. In some embodiments, the complexity module 202 uses the nodes of the knowledge graph to determine the complexity score of content information (e.g., actor, character, plot arc, topic, etc.) and/or a segment of the media asset 208 based on the number of links to the nodes corresponding to said information. In some embodiments, the complexity score is determined based on in intrinsic data (data about the segment being viewed/info in the knowledge graph) and/or other data. For example, the other data may be associated with local sensors in the user's vicinity (e.g., motion sensors, noise sensors, etc.) as well as profile data of the viewer. In some embodiments, sensor data is an indication that a received trick play command is in response to a distraction and is not in response to a poor understanding of the topic.

In some embodiments, replaying a political-segment or a segment which relates to historical events might result in the extraction and presentation of the main topics in the segment, related topics in subsequent segments, and/or subsequent episodes of the media asset (i.e., segments that will be presented later in the media asset in order to prevent another a trick play command and/or viewing interruption). In some embodiments, the system displays multiple options for supplemental content where each option corresponds to a different topic and the user can select the option corresponding to the topic that they want to see supplemental information about. For example, a segment from a movie that talks about the "prohibition period" in the early 1900s may result in the display of selectable options for 'prohibition' and 'bootlegging' if "bootlegging" is discussed in a subsequent segment of the media asset. In some embodiments, supplemental content can be in any form (text, pictures, short videos, etc.) and obtained from various sources (e.g., verified websites, search engines, and/or a predefined pool of content/content sources). In some embodiments, a generated knowledge graph for the media asset is used to determine similar/related topics or concepts. In some embodiments, a knowledge graph for the media asset is partially constructed based on a more general knowledge graph that is not specific to the media asset.

Figure 3A:
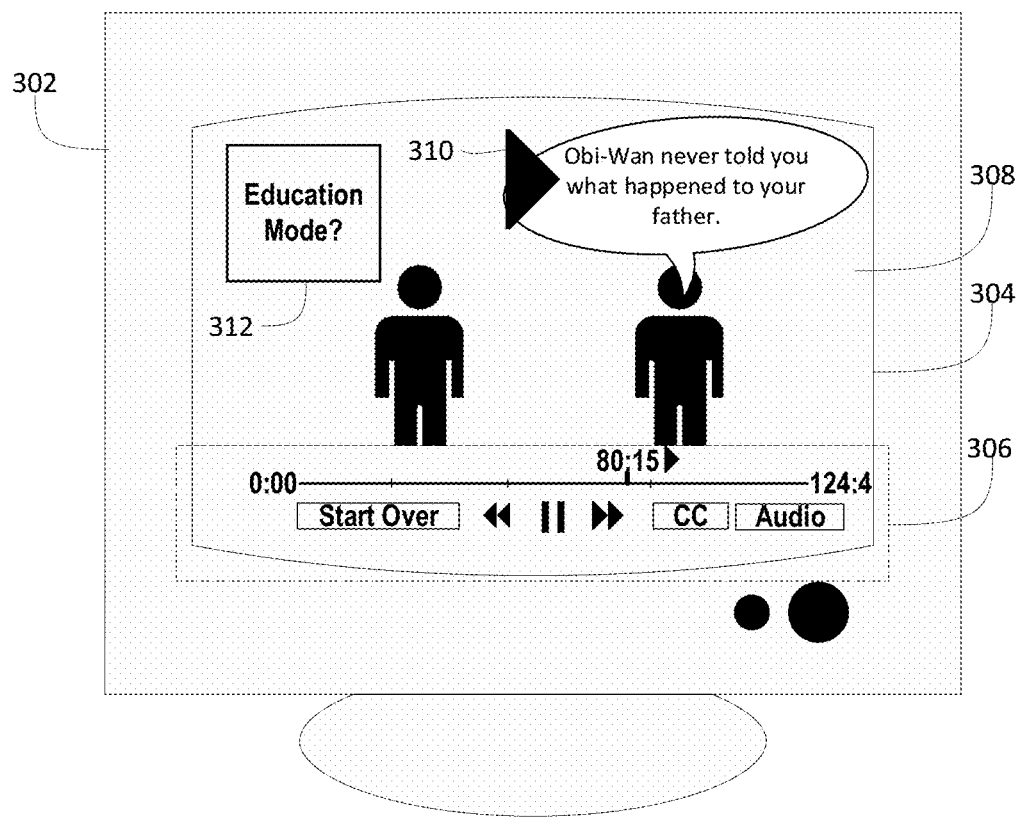
FIGS. 3A-3C show illustrative diagrams of a user device including supplemental content along with complex media segments during trick play, in accordance with embodiments of the disclosure.
Figure 3B:
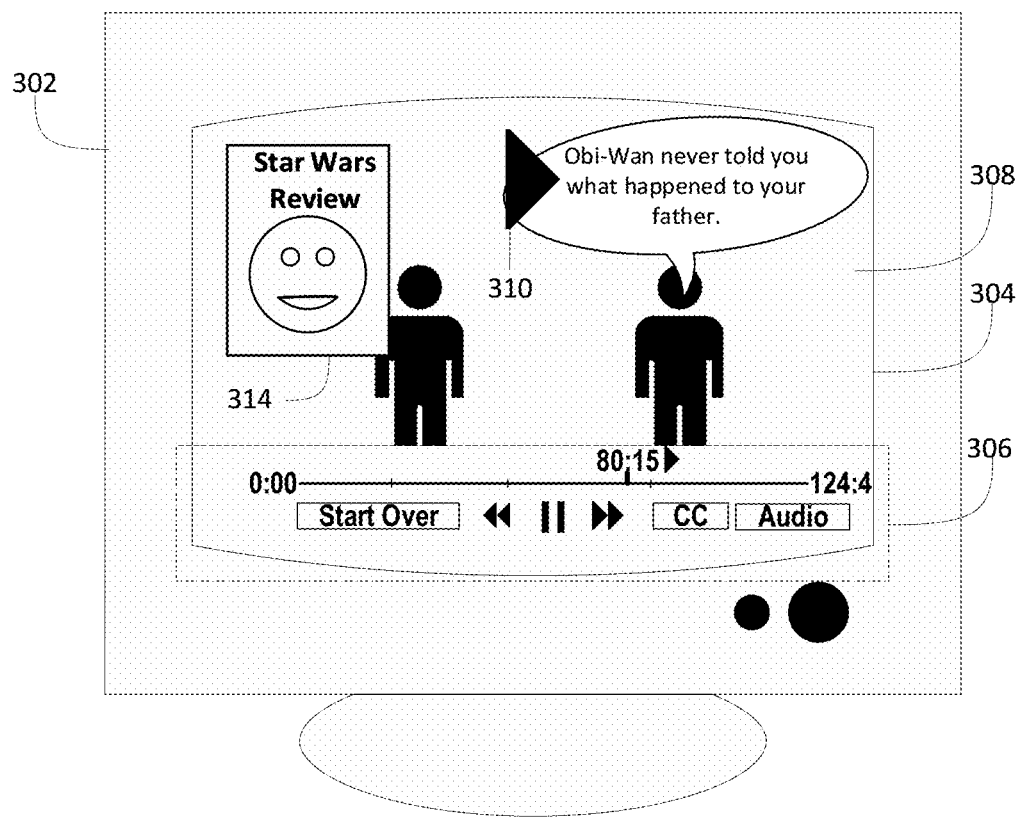
Figure 3C:
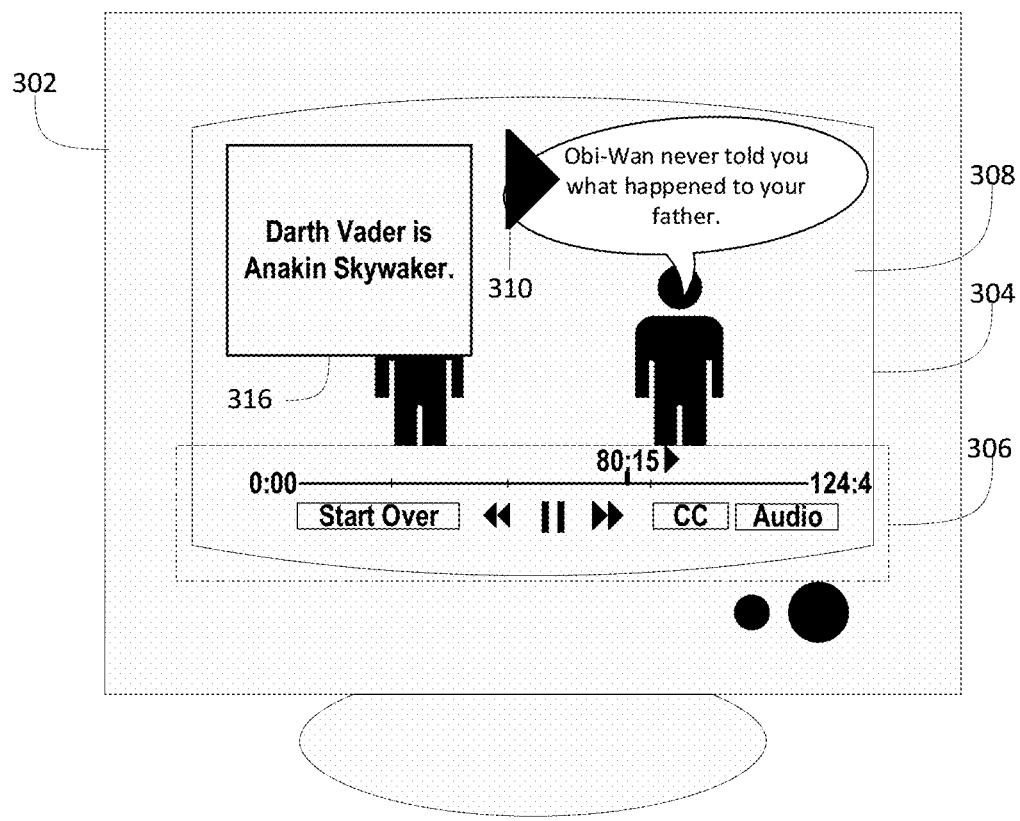

FIGS. 3A-3C show illustrative diagrams of a user device 302 including supplemental content along with a complex segment 308, in accordance with some embodiments of the disclosure. FIG. 3A displays a user device 302 displaying a complex segment 308 of a media asset on a display 304. In some embodiments, the user device 302 is resuming playback 310 of a complex segment 308 after a user issued a first trick play command (e.g., pause, rewind, etc.). In some embodiments, the user device 302 resumes playback 310 after rewinding to the beginning of the complex segment 308. In some embodiments, the user device 302 resumes playback 310 after receiving a play command from a user. In some embodiments, a user inputs one or more commands using a selectable menu 306. In some embodiments, the user device 302 uses any of the methodologies described herein to determine that the complex segment 308 is complex. For example, the user device 302 may determine that the complex segment 308 is complex because the metadata associated with the complex segment 308 comprises a complexity identifier.

In some embodiments, the user device 302 includes a first option 312 along with the complex segment 308. In some embodiments, the first option 312 is displayed if the user device 302 has access to supplemental content. In some embodiments, the first option 312 is displayed if a cloud-service that is responsible for aggregating additional content about the segment, has such content available. In some embodiments, the first option 312 is overlaid on the complex segment 308 during playback 310. Upon selection of the first option 312, the user device 302 can display supplemental content. For example, the user device 302 may display a review related to the complex segment 308 as an overlay, as the complex segment 308 continues playing. The user device 302 may display the first option 312 for certain types of complex segments and/or for certain instances. For example, the first option 312 may be available for segments geared toward children and/or educational segments. In another example, the first option 312 may be generated after the user causes the user device 302 to rewind the complex segment 308 more than once. In some embodiments, the user device 302 uses any of the methodologies described herein to generate and/or display supplemental content.

In some embodiments, certain supplemental content may be designed to be played along with the complex segment 308. For example, the supplemental content may include visual overlays (e.g., boxes, pointers, etc.) to help direct the user's attention to important elements of the complex segment 308. In another example, the supplemental content may include a review explaining important elements of the complex segment 308 as the complex segment 308 plays. In another example, if the system determines that the user is reviewing a segment to find a hidden feature (e.g., Easter egg) the supplemental content may include visual overlays to help direct the user's attention to the hidden feature. In some embodiments, the system uses metadata related to the segment to determine a location of a hidden feature.

As shown in FIG. 3B, the user device 302 can include a second option 314 along with the complex segment 308. In some embodiments, the second option 314 is a link to supplemental content. In some embodiments, the second option 314 is overlaid on the complex segment 308 during playback 310. Upon selection of the second option 314, the user device 302 can display supplemental content. For example, the user device 302 may display a review related to the complex segment 308 as an overlay as the complex segment 308 continues playing. In another example, the user device 302 may pause playback of the complex segment 308 and display a review related to the complex segment 308 before resuming playback. In some embodiments, the second option 314 includes a thumbnail relating to the supplemental content. For example, the second option 314 may include a thumbnail of a review of the complex segment 308. In some embodiments, the user device 302 uses any of the methodologies described herein to generate and/or display supplemental content.

As shown in FIG. 3C, the user device 302 can include a first supplemental content 316 along with the complex segment 308. In some embodiments, the first supplemental content 316 is text, audio, and/or video overlaid on the complex segment 308 during playback 310. In some embodiments, the first supplemental content 316 is played automatically upon a user issuing a trick play command during the complex segment 308. In some embodiments, the user device 302 uses any of the methodologies described herein to generate and/or display the first supplemental content 316. In some embodiments, the user device 302 determines to display the first option 312, second option 314, and/or first supplemental content based on user information. For example, the user information may indicate that the preference for supplemental content of the user viewing the complex segment 308 is text supplemental content (e.g., first supplemental content 316) overlaid during playback of a complex segment. In another example, the user information may indicate that the user viewing the complex segment 308 prefers a selectable object (e.g., first option 312, second option 314) that causes playback of supplemental content.

Figure 4:
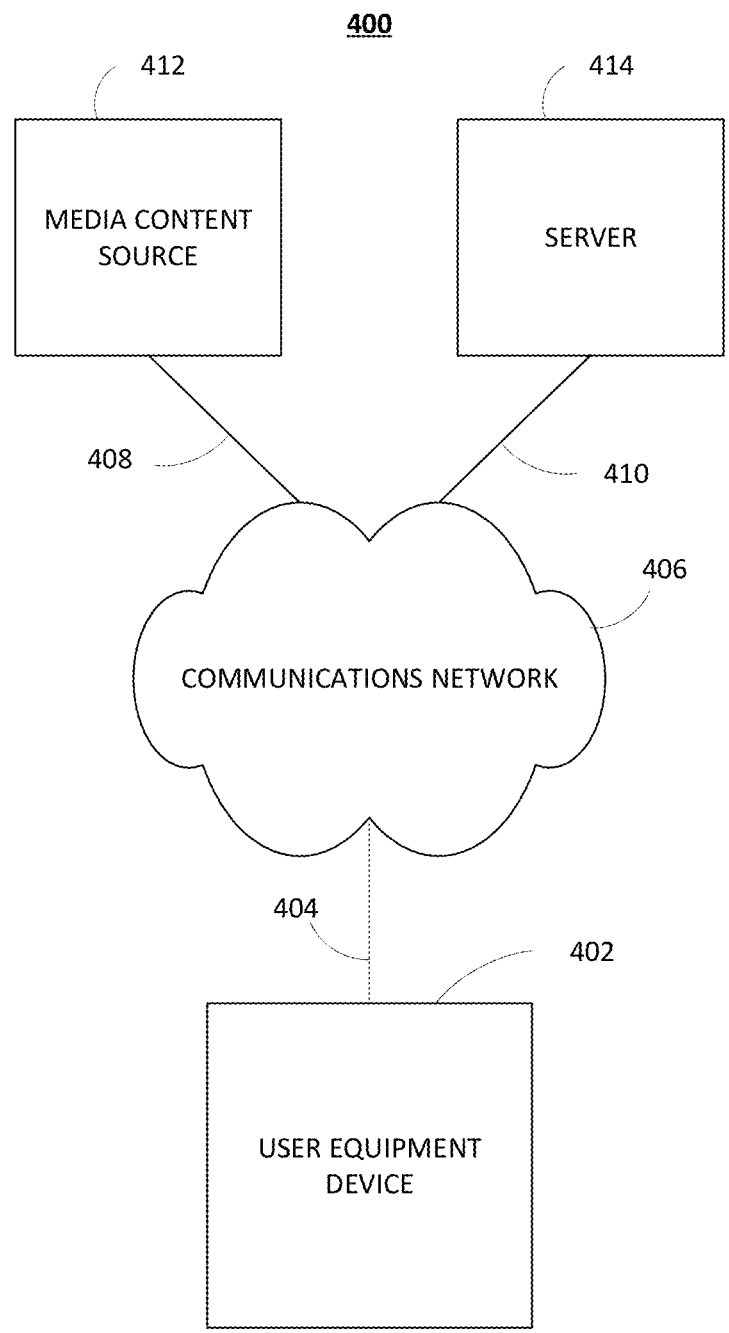
FIG. 4 shows an illustrative block diagram of a media system, in accordance with embodiments of the disclosure.
Figure 5:
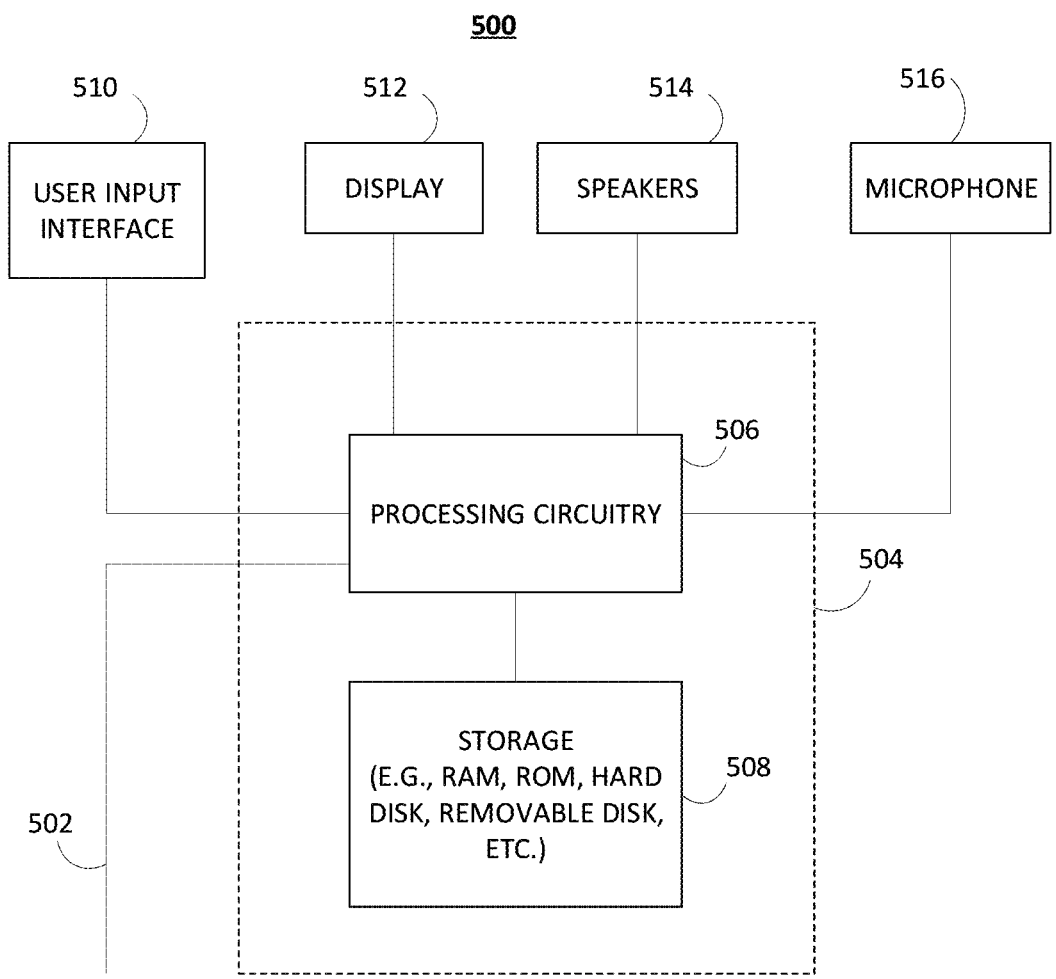
FIG. 5 shows an illustrative block diagram of a user equipment (UE) device system, in accordance with embodiments of the disclosure.

FIGS. 4-5 describe exemplary devices, systems, servers, and related hardware for including supplemental content along with complex media segments during trick play, in accordance with some embodiments of the enclosure. In the system 400, there can be more than one user equipment device 402, but only one is shown in FIG. 4 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 406.

The user equipment devices may be coupled to communications network 406. Namely, the user equipment device 402 is coupled to the communications network 406 via communications path 404. The communications network 406 may be one or more networks including the Internet, a mobile phone network, mobile voice or data network (e.g., a 4G or LTE network), cable network, public switched telephone network, or other types of communications network or combinations of communications networks. The path 404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, path 404 can be a wireless path. Communications with the user equipment device 402 may be provided by one or more communications paths but is shown as a single path in FIG. 4 to avoid overcomplicating the drawing.

The system 400 also includes media content source 412, and server 414, which can be coupled to any number of databases providing information to the user equipment devices. The media content source 412 represents any computer-accessible source of content, such as a storage for audio content, metadata, or, similar such information. The server 414 may store and execute various software modules to implement the providing of supplemental content along with complex media segments functionality. In some embodiments, the user equipment device 402, media content source 412, and server 414 may store metadata associated with a media asset.

FIG. 5 shows a generalized embodiment of a user equipment device 500, in accordance with one embodiment. In an embodiment, the user equipment device 500 is the same user equipment device 402 of FIG. 4. The user equipment device 500 may receive content and data via input/output (hereinafter "I/O") path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry 506 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of supplemental content along with complex media segments functionality can be at least partially implemented using the control circuitry 504. The providing of supplemental content along with complex media segments functionality described herein may be implemented in or supported by any suitable software, hardware, or combination thereof. The providing of supplemental content along with complex media segments functionality can be implemented on user equipment, on remote servers, or across both.

In client/server-based embodiments, the control circuitry 504 may include communications circuitry suitable for communicating with one or more servers that may at least implement the described providing of supplemental content along with complex media segments functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing.

The user equipment device 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of user equipment device 500 or may be a stand-alone unit.

The user equipment device 500 of FIG. 5 can be implemented in system 400 of FIG. 4 as user equipment device 402, but any other type of user equipment suitable for providing of supplemental content along with complex media segments may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 6:
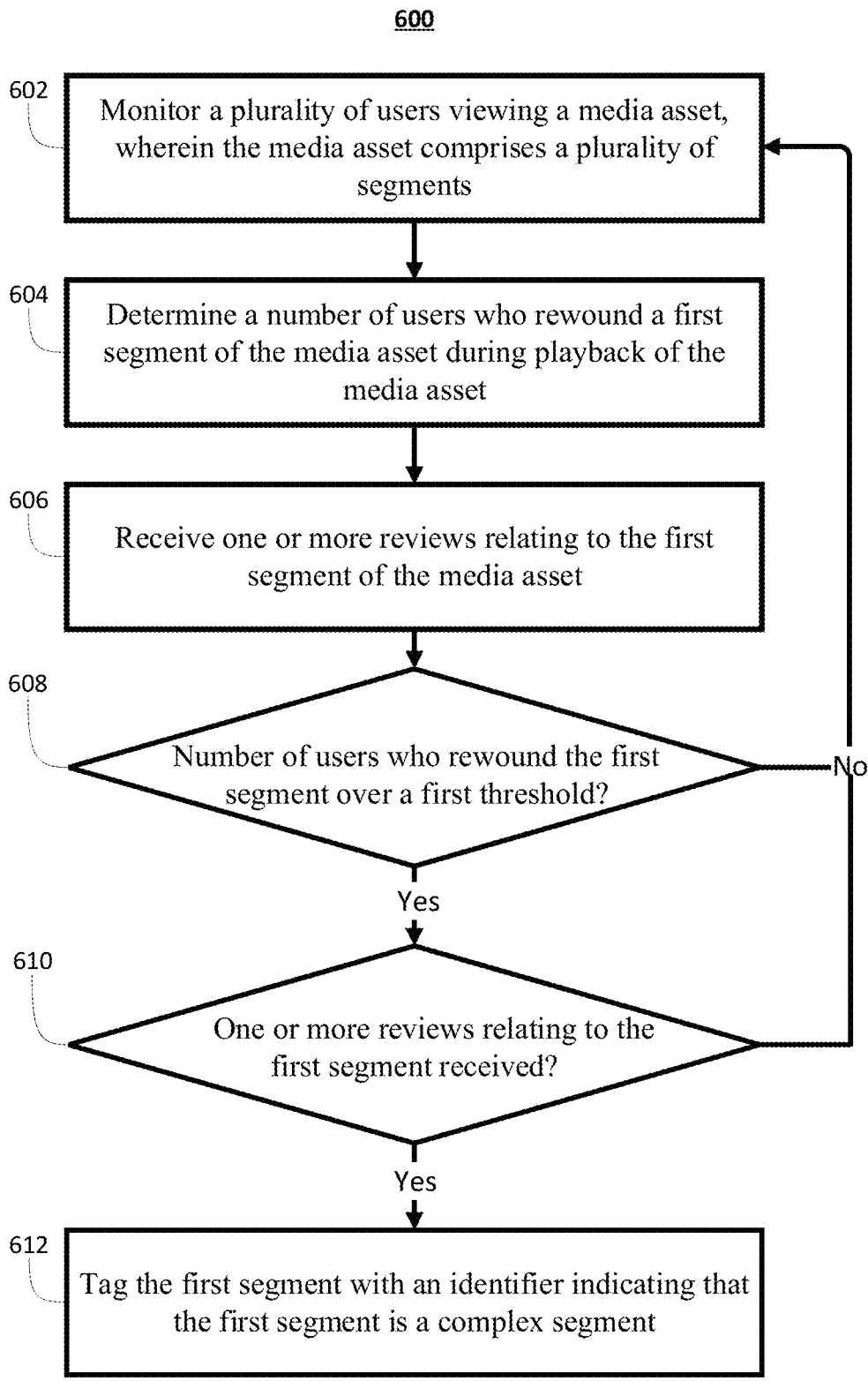
FIG. 6 is an illustrative flowchart of a process for determining that a segment of a media asset is complex, in accordance with embodiments of the disclosure.

FIG. 6 is an illustrative flowchart of a process 600 for determining that a segment of a media asset is complex, in accordance with embodiments of the disclosure. Process 600, and any of the following processes, may be executed by control circuitry 504 on a user equipment device 500. In some embodiments, control circuitry 504 may be part of a remote server separated from the user equipment device 500 by way of a communications network or distributed over a combination of both. In some embodiments, instructions for executing process 600 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry, and the like. It should be noted that the process 600, or any step thereof, could be performed on, or provided by, any of the devices shown in FIGS. 1-5. Although the process 600 is illustrated as described as a sequence of steps, it is contemplated that various embodiments of process 600 may be performed in any order or combination and need not include all the illustrated steps.

At 602, control circuitry monitors a plurality of users viewing a media asset, wherein the media asset comprises a plurality of segments. In some embodiments, the control circuitry monitors the plurality of users' viewing habits to determine consumption data. For example, the control circuitry may provide (e.g., transmit) the media asset to a user and monitor whenever a user issues a trick play command. In some embodiments, whenever a user issues a trick play command, the control circuitry is notified. In some embodiments, a second device records each trick play command received from a user watching the media asset and transmits the aggregated data to the control circuitry. In some embodiments, the control circuitry monitors the number of users who rewound and/or paused a plurality of segments of the media asset. The control circuitry may also record additional information (e.g., demographic traits of the user, time of trick play command, etc.) related to the trick play command. In some embodiments, the control circuitry stores the consumption data in a database. In some embodiments, the control circuitry only stores consumption data for segments that receive a threshold number of trick play commands.

At 604, control circuitry determines a number of users who rewound a first segment of the media asset during playback of the media asset. In some embodiments, the control circuitry uses consumption data generated during the monitoring of step 602 to determine the number of users who rewound the first segment. In some embodiments, the control circuitry stores and/or receives the consumption data in a table format (e.g., first consumption data 214). In some embodiments, the control circuitry can use the consumption data to determine trends. For example, the control circuitry can determine that a first group of users issued a rewind command during a first segment and that a majority of the first group of users have a first demographic trait (e.g., age, gender, ethnicity, location, occupation, etc.). In some embodiments, the control circuitry stores the trends in a database.

At 606, control circuitry receives one or more reviews relating to the first segment of the media asset. In some embodiments, the control circuitry receives a plurality of reviews related to the media asset from a server. In some embodiments, the control circuitry requests and/or searches for reviews relating to the first segment and/or the segments during which the plurality of users issued trick play commands. In some embodiments, the control circuitry searches a database and/or online platform for reviews related to the first segment and/or media asset. For example, the control circuitry may search for reviews that discuss a word or phrase (e.g., "No. I am your father.") that is contained in the dialogue of the first segment. In another example, the control circuitry may search for reviews associated with a first identifier (e.g., Luke's father) that is similar to or the same as a second identifier (e.g., Darth Vader) found in metadata associated with the media asset and/or the first segment of the media asset. In some embodiments, the one or more reviews include review information, such as an indicator that a review relates to the media asset and/or the first segment of the media asset. For example, the review information can include the segment that a review relates to, the review ID, the format of a review, the duration of a review, and the source of a review.

At 608, the control circuitry determines whether the number of users who rewound the first segment is over a first threshold. In some embodiments, the first threshold is based on the total number of users monitored in step 602. For example, if 100 users were monitored, the first threshold may be ten, and if 1000 users were monitored, the first threshold may be 100. If the control circuitry determines that the number of users who rewound the first segment is over a first threshold, the process 600 continues to step 610. If the control circuitry determines the number of users who rewound the first segment is not over the first threshold, the process 600 continues back to step 602.

At 610, the control circuitry determines whether one or more reviews relating to the first segment were received. If the control circuitry determines that one or more reviews relating to the first segment were received, the process 600 continues to step 612. If the control circuitry determines one or more reviews relating to the first segment were not received, the process 600 continues back to step 602. In some embodiments, the process 600 continues to step 612 only if the control circuitry determines that a second threshold number of reviews are received. In some embodiments, the process 600 continues to step 612 only if the control circuitry determines that one or more reviews satisfy one or more parameters (e.g., more than 1,000 views). In some embodiments, the control circuitry uses credentials (e.g., number of views, number of likes, number of comments, number of verifications, etc.) of the one or more reviews to determine if the one or more parameters are satisfied.

At 612, the control circuitry tags the first segment with an identifier indicating that the first segment is a complex segment. In some embodiments, the identifier is included in the metadata of the media asset and/or first segment. In some embodiments, the identifier includes one or more complexity factors (e.g., the viewing habits of users who have watched the first segment, reviews related to the first segment, complexity score for the first segment, etc.). In some embodiments, each segment of the plurality of segments that the control circuitry determines to be complex is tagged with a complexity identifier, generating a media asset with complexity identifiers. In some embodiments, the media asset with complexity identifiers is transmitted to one or more user devices for playback. In some embodiments, the identifier indicating that the first segment is complex comprises demographic information related to the number of users who rewound the first segment. For example, if a majority of the number of users who rewound the first segment have a first demographic trait (e.g., under twelve years old) then the identifier may include the demographic trait in the identifier. Accordingly, a user device may determine that the first segment is complex for users of the first demographic trait (e.g., under twelve years old) but not for users of a second demographic trait (e.g., over twelve years old).

Figure 7:
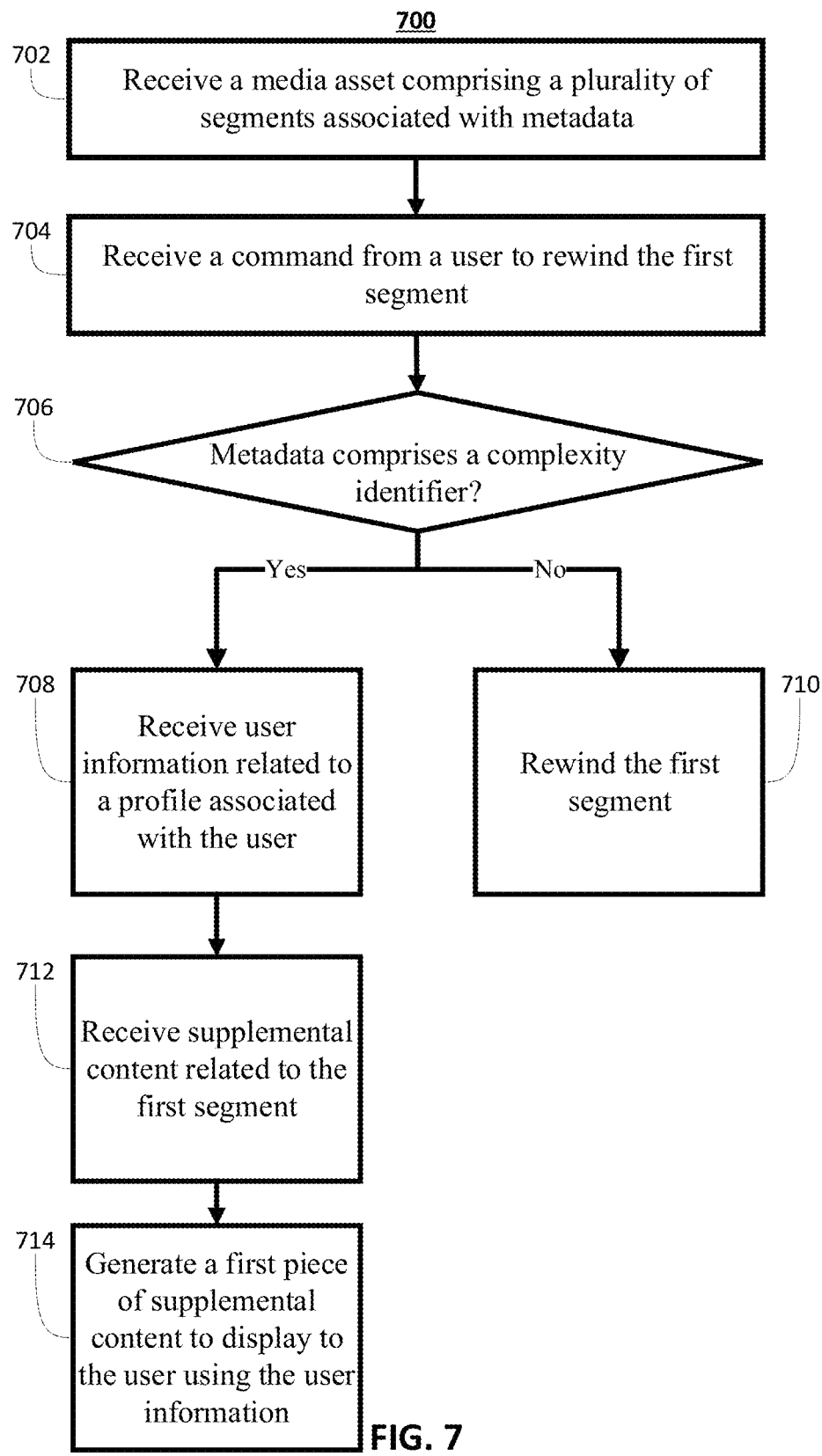
FIG. 7 is an illustrative flowchart of a process for generating supplemental content along with complex media segments during trick play, in accordance with embodiments of the disclosure.

FIG. 7 is an illustrative flowchart of a process 700 for generating supplemental content along with complex media segments during trick play, in accordance with embodiments of the disclosure.

At 702, control circuitry receives a media asset comprising a plurality of segments associated with metadata. In some embodiments, the media asset is received from a server. In some embodiments, the metadata is received with the media asset. In some embodiments, the metadata includes content information (e.g., actor, character, plot arc, topic, etc.), audio information (e.g., dialogue, music, etc.), video information (e.g., focal point of a segment, speed of a segment, etc.), identifiers (e.g., complexity identifier) and/or similar such information.

At 704, control circuitry receives a command from a user to rewind the first segment. In some embodiments, the command 110 is received when a user selects a rewind button from a menu (e.g., menu 106) during the first segment. In some embodiments, the rewind command is received when a user presses a button on a remote control, issues a voice command and/or similar such methodologies. Although a rewind command is discussed in process 700, similar such commands may be used (e.g., pause, skip, fast-forward, etc.) and supplemental content can be generated according to process 700.

At 706, control circuitry determines whether the metadata related to the first segment comprises a complexity identifier. In some embodiments, the complexity identifier includes one or more complexity factors (e.g., the viewing habits of users who have watched the first segment, reviews related to the first segment, complexity score for the first segment, etc.). In some embodiments, the complexity identifier comprises demographic information related to a number of users who rewound the first segment. If the metadata related to the first segment comprises a complexity identifier, the process 700 continues to step 708. If the metadata related to the first segment does not comprise a complexity identifier, the process 700 continues to step 710. At step 710, control circuitry rewinds the first segment without providing supplemental content. In some embodiments, the control circuitry monitors the user's viewing behavior to update a profile associated with the user. For example, the control circuitry may record that the user issued the command received in step 704 during the first segment.

At 708, control circuitry receives user information related to a profile associated with the user. In some embodiments, the profile stores user information relating to the user's demographic traits, viewing environment, viewing habits, preferences, and similar such information.

At 712, control circuitry receives supplemental content related to the first segment. In some embodiments, the control circuitry receives a plurality of supplemental content related to the media asset from a server, wherein the plurality of supplemental content comprises supplemental content related to the first segment and/or the media asset. In some embodiments, the control circuitry requests and/or searches for supplemental content (e.g., reviews) relating to the first segment and/or media asset. In some embodiments, the control circuitry searches a database and/or online platform for supplemental content related to the first segment and/or media asset. For example, the control circuitry may search for reviews that discuss a word or phrase (e.g., "No. I am your father.") that is contained in the dialogue of the first segment. In another example, the control circuitry may search for supplemental content associated with a first identifier (e.g., Luke's father) that is similar to or the same as a second identifier (e.g., Darth Vader) found in metadata associated with the media asset and/or the first segment of the media asset. In some embodiments, one or more pieces of the received supplemental content indicate supplemental content information (e.g., the segment to which the supplemental content relates, the supplemental content ID, the format of the supplemental content, the duration of the supplemental content, and the source of the supplemental content).

At 714, control circuitry generates a first piece of supplemental content to display using the user information. In some embodiments, the control circuitry selects the first piece of supplemental content from the supplemental content received in step 712. In some embodiments, the control circuitry generates the first piece of supplemental content based on user preferences. For example, the user information can indicate that the user prefers supplemental content in an audio format, and the control circuitry can select an audio review explaining the first segment from the supplemental content received in step 712. In another example, the user information can indicate that the user prefers supplemental content from a certain source (e.g., IMDb), and the control circuitry can select the highest-rated video relating to the first segment from the preferred source as the first piece of supplemental content. In some embodiments, the control circuitry determines the display format of the generated first piece of supplemental content based on user information. For example, the user information may indicate that the user prefers supplemental content as textual supplemental content overlaid during playback of the first segment. In another example, the user information may indicate that the user prefers a selectable object that, when selected, causes playback of the first piece of supplemental content.

In some embodiments, the control circuitry generates the first piece of supplemental content using the received supplemental content. For example, the control circuitry may generate a video montage (first piece of supplemental content) using previous segments of the media asset and/or related media assets (received supplemental content). In some embodiments, segments and/or scenes of the media asset are categorized based on content information (e.g., actor, character, plot arc, topic, etc.). In some embodiments, when the control circuitry determines that the first segment is associated with a first content information (e.g., Darth Vader being Luke's father) the control circuitry generates a montage including previous segments that are also associated with the first content information (e.g., previous actions showing how Darth Vader is Luke's father). For example, the video montage for the first segment may contain parts from a second segment (e.g., romance between Padmé and Anakin) and a third segment (e.g., Anakin becoming Darth Vader) because the second and third segments relate to the first segment (Darth Vader being Luke's father) and help the user better understand the first segment.

In some embodiments, when a media asset is broadcasted, the control circuitry associates key segments/scenes of the media asset with a specific actor (e.g., unique ID). In some embodiments, the control circuitry categorizes the segments based on their content (e.g., good times, revenge, etc.). In some embodiments, categorizing the segments based on their content allows the control circuitry to tie an action taken by a character to a segment. In some embodiments, the control circuitry updates a data structure(s) associated with a character as subsequent episodes, related to the media asset, are broadcast. Such data structures can reference specific segments which may be accessible to a montage creation service that stitches segments from different episodes together or selects a few segments to stitch together based on the length of the desired montage. For example, a first user might enjoy watching a short montage (e.g., thirty seconds) while a second user might prefer a longer montage (e.g., two minutes). In some embodiments, the montage service can create and update montages for different viewers (after more episodes related to the media asset are watched and/or more of the media asset is consumed). In some embodiments, the montage service utilizes a user's current viewing progress to dynamically generate such montages, preventing the showing of spoilers to the user. In some embodiments, the availability or option to present the montage can be tied to specific portions of the content and/or is presented in response to a general user query such as "what did he mean?"

Figure 8:
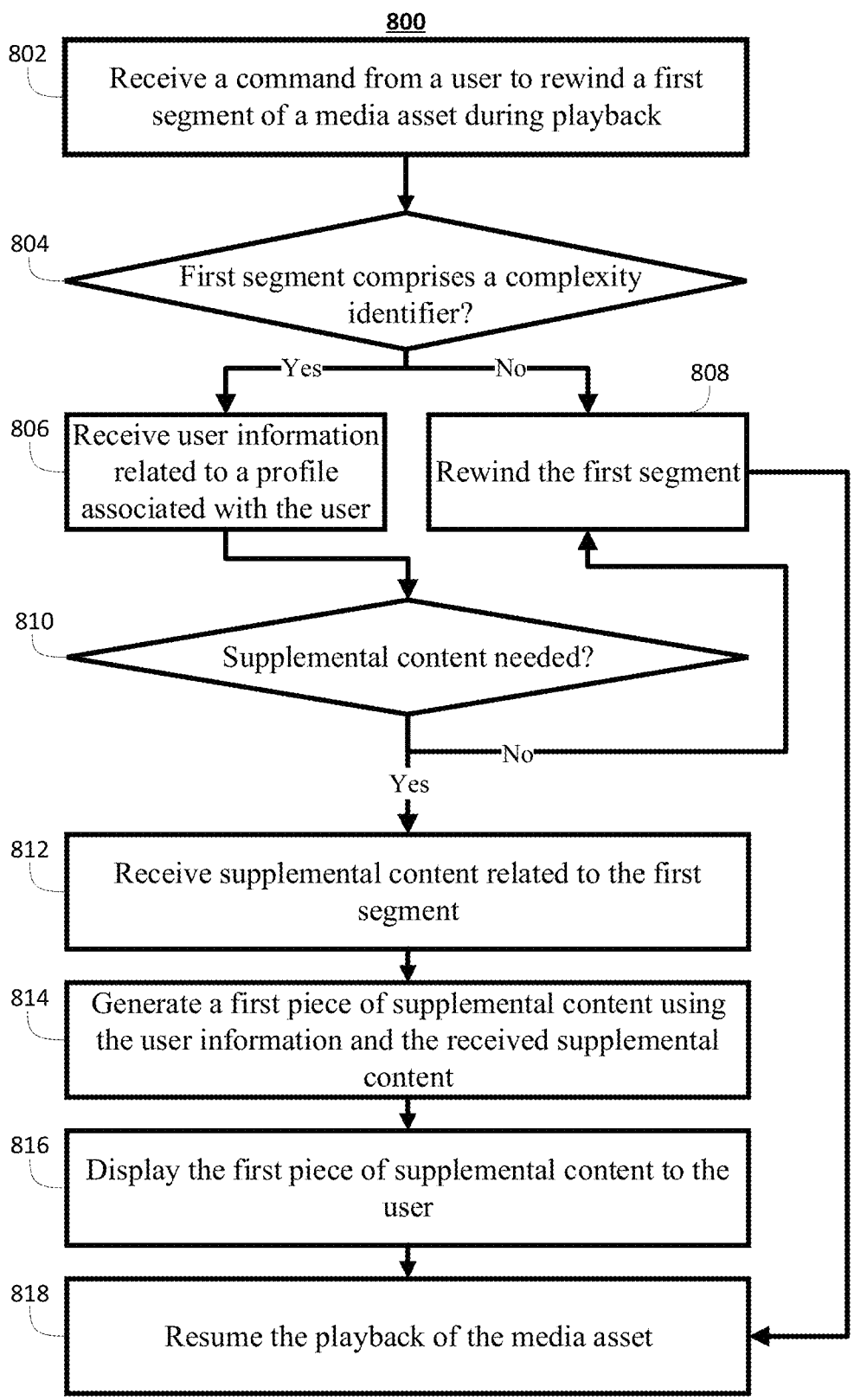
FIG. 8 is another illustrative flowchart of a process for generating supplemental content along with complex media segments during trick play, in accordance with embodiments of the disclosure.

FIG. 8 is another illustrative flowchart of a process for generating supplemental content along with complex media segments during trick play, in accordance with embodiments of the disclosure.

At 802, control circuitry receives a command from a user to rewind a first segment of a media asset during playback. In some embodiments, step 802 uses the same or similar methodologies as step 704 described above.

At 804, control circuitry determines whether the first segment comprises a complexity identifier. In some embodiments, the control circuitry uses metadata associated with the first segment to determine if the first segment comprises a complexity identifier. In some embodiments, the complexity identifier includes one or more complexity factors (e.g., the viewing habits of users who have watched the first segment, reviews related to the first segment, complexity score for the first segment, etc.). In some embodiments, the complexity identifier comprises demographic information related to a number of users who rewound the first segment. If the control circuitry determines that the first segment comprises a complexity identifier, the process 800 continues to step 806. If the control circuitry determines the first segment does not comprise a complexity identifier, the process 800 continues to step 808. At step 808, control circuitry rewinds the first segment without providing supplemental content. In some embodiments, the control circuitry monitors the user's viewing behavior to update a profile associated with the user.

At 806, control circuitry receives user information related to a profile associated with the user. In some embodiments, the profile stores user information relating to the user's demographic traits, viewing environment, viewing habits, preferences, and/or similar such information. In some embodiments, the control circuitry requests user information related to the first segment. For example, if the first segment is associated with a first topic (e.g., World War I) the control circuitry may request user information related to the user's viewing history of media assets relating to the first topic. In another example, if the first segment is associated with age-specific information (e.g., reference to a movie from 1982), the control circuitry may request user information related to the user's age. In another example, if the first segment is associated with a location (e.g., New York) the control circuitry may request user information related to the user's location.

At 810, control circuitry determines whether supplemental content is needed. In some embodiments, the control circuitry determines whether supplemental content is needed using a complexity identifier. For example, if the first segment comprises a complexity identifier, then the control circuitry may determine that supplemental content is required.

In some embodiments, the control circuitry uses the received user information to determine if supplemental content is needed. For example, the user information may indicate that a loud noise (e.g., doorbell, talking, etc.) was detected in the vicinity of the user device before the received command was received. The control circuitry may determine that no supplemental content is needed despite the first segment comprising a complexity identifier because the loud noise was likely the reason for the received command and not the complexity of the scene. In another example, the control circuitry may receive the command from the user during the first segment, tagged as complex, and the user information may indicate that the user often watches media assets involving a first topic (e.g., space travel). The control circuitry may determine (e.g., using complexity information related to the first segment) that the first segment includes the first topic. The control circuitry may determine that no supplemental content is needed, despite the first segment being tagged as complex, because the user often watches content involving the first topic and likely issued the command due to interest in the first segment rather than being confused by the first segment. In another example, the control circuitry may receive the command from the user during the first segment, tagged as complex, and the user information may indicate that the user has a first demographic trait (e.g., being ten years old). The control circuitry may determine (e.g., using complexity information related to the first segment) that the first segment is often rewound by a first group of users with a shared demographic trait (e.g., users less than 15 years old). The control circuitry may determine that supplemental content is needed because the user's first demographic trait falls within the shared demographic trait. In another example, the control circuitry may receive the command from the user during the first segment tagged as complex and the user information may indicate that the user has a first demographic trait (e.g., being 20 old). The control circuitry may determine (e.g., using complexity information related to the first segment) that the first segment is often rewound by a first group of users with a shared demographic trait (e.g., users less than 15 years old). The control circuitry may determine that supplemental content is not needed because the user's first demographic trait falls outside of the shared demographic trait.

In some embodiments, the control circuitry uses the complexity information and/or user information to generate a complexity score. In some embodiments, if the control circuitry determines that the complexity score is over a threshold, the control circuitry determines that supplemental content is needed. In some embodiments, the control circuitry weights inputs differently when generating a complexity score. For example, consumption data indicating that a first segment was rewound by a first number of users (e.g., 500 users) may be weighted higher than review information indicating that there are only a few reviews relating to the first segment. In another example, the user information may indicate that a loud noise (e.g., doorbell, talking, etc.) was detected in the vicinity of the user device before the received command was received, and the complexity information may indicate that a first number of users (e.g., 500 users) rewound the first segment. In some embodiments, the control circuitry weights the user information higher than the complexity information and determines that no supplemental content is needed. If the control circuitry determines that supplemental content is needed, the process 800 continues to step 812. If the control circuitry determines that no supplemental content is needed, the process 800 continues to step 808.

At 812, control circuitry receives supplemental content related to the first segment. In some embodiments, step 812 uses the same or similar methodologies as step 712 described above.

At 814, control circuitry generates a first piece of supplemental content using the user information and the supplemental content. In some embodiments, step 814 uses the same or similar methodologies as step 714 described above. In some embodiments, the control circuitry generates the first piece of supplemental content using a complexity score. In some embodiments, different complexity scores result in different supplemental content being generated. For example, if a complexity score is above a first threshold, the control circuitry may generate a first type of supplemental content (e.g., in-depth review explaining the first segment), and if the complexity score is below the first threshold, the control circuitry may generate a second type of supplemental content (e.g., text box summarizing the scene, laugh track, etc.).

In some embodiments, the control circuitry uses an assisted rewind algorithm that has the task of determining a user's intention when performing a rewind functionality. In some embodiments, the assisted rewind algorithm uses one or more factors to compute or determine a complexity score of the first segment and replay an augmented version of the first segment based on such score. In some embodiments, the complexity score is not a numerical value but rather a value that represents a genre (e.g., comedy, sports, etc.), allowing a replay algorithm to replay the first segment by performing specific action items listed in dynamically generated templates for the first segment. In some embodiments, the rewind template is used to augment the content of the first segment during replay based on suggested actions. For example, a replay of a comedy segment with a low complexity score might result in automatically augmenting the replay with a background laugh track (e.g., re-watching the segment feels like watching a sitcom in such scenario), or displaying various emojis on the screen.

At 816, control circuitry displays the first piece of supplemental content to the user. In some embodiments, the supplemental content is overlaid on the first segment. In some embodiments, the first segment is paused until the conclusion of the supplemental content. In some embodiments, the first piece of supplemental content is displayed automatically. In some embodiments, the control circuitry displays a link to the first piece of supplemental content and displays the first piece of supplemental content if the user selects the link. In some embodiments, the control circuitry displays the first piece of supplemental content using user preferences. For example, the user information may indicate that the user prefers supplemental content as an overlay. In some embodiments, the control circuitry displays the first piece of supplemental content using any of examples shown and/or described in FIGS. 1A-1C and 3A-3C.

At 818, control circuitry resumes playback of the media asset.

It is contemplated that some suitable steps or suitable descriptions of FIGS. 6-8 may be used with other suitable embodiments of this disclosure. In addition, some suitable steps and descriptions described in relation to FIGS. 6-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-8.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for providing supplemental content, the method comprising using processing circuitry for:
    monitoring a plurality of users viewing a media asset for viewing habits relating to the media asset, wherein the media asset comprises a plurality of segments;
    determining, using the viewing habits of the plurality of users, that more than a first threshold number of users, of the plurality of users, rewound a first segment of the media asset during playback of the media asset;
    receiving one or more reviews relating to the first segment of the media asset; and
    in response to determining that more than the first threshold number of users, of the plurality of users, rewound the first segment and that there are one or more reviews relating to the first segment, tagging the first segment with an identifier indicating that the first segment is a complex segment, wherein the identifier comprises a number of the plurality of users who rewound the first segment.

2. The method of claim 1, further comprising transmitting the media asset comprising the first segment tagged with an identifier to a user device.

3. The method of claim 1, wherein the identifier comprises a complexity score calculated using the viewing habits relating to the media asset and the one or more reviews relating to the first segment.

4. The method of claim 1, wherein the identifier also comprises a number of the plurality of users who paused the first segment.

5. The method of claim 1, wherein the identifier comprises demographic information related to the plurality of users who rewound the first segment.

6. The method of claim 5, wherein a majority of the plurality of users who rewound the first segment have a first piece of demographic trait information in common.

7. The method of claim 1, wherein the identifier comprises review information associated with the one or more reviews relating to the first segment.

8. The method of claim 2, further comprising:
receiving, by the user device, the media asset comprising the plurality of segments;
receiving, by the user device, a command from a user to rewind the first segment of the plurality of segments;
determining, by the user device, that the first segment comprises the identifier;
receiving user information related to a profile associated with the user;
generating a first piece of supplemental content to display to the user based on the first segment comprising the identifier, wherein the first piece of supplemental content is generated using the user information.

9. The method of claim 8, further comprising:
rewinding, by the user device, the first segment;
displaying, by the user device, the first piece of supplemental content; and
displaying, by the user device, the first segment after the first piece of supplemental content.

10. The method of claim 8, further comprising:
displaying, by the user device, a selectable option to view the first piece of supplemental content; and
in response to receiving a selection of the displayed option, displaying, by the user device, the first piece of supplemental content.

11. The method of claim 10, wherein the selectable option is overlaid on the media asset.

12. The method of claim 10, wherein the selectable option to view the first piece of supplemental content is displayed as the first segment is displayed.

13. The method of claim 10, wherein the selectable option to view the first piece of supplemental content is displayed as the first segment is rewound.

14. The method of claim 8, wherein the first piece of supplemental content is a first review of the one or more reviews relating to the first segment.

15. The method of claim 8, wherein the first piece of supplemental content is a montage comprising a second segment of the media asset.

16. The method of claim 8, wherein the user information indicates a first user preference relating to supplemental content.

17. The method of claim 16, wherein the first piece of supplemental content is generated according to the first user preference.

18. The method of claim 17, wherein the first user preference indicates that the user prefers supplemental content in a video format and the first piece of supplemental content is generated in a video format.

\* \* \* \* \*